United States Patent
Liu et al.

(10) Patent No.: US 11,891,545 B2
(45) Date of Patent: Feb. 6, 2024

(54) COMPOSITION, LOW HALOGEN AND FAST CURING CONDUCTIVE ADHESIVE AND ITS PREPARATION METHOD

(71) Applicant: Blue Ocean & Black Stone Technology Co., Ltd. (Beijing), Beijing (CN)

(72) Inventors: Wanshuang Liu, Beijing (CN); Hebin Luo, Beijing (CN); Yi Wei, Beijing (CN)

(73) Assignee: Blue Ocean & Black Stone Technology Co., Ltd.(Beijing)

( * ) Notice: Subject to any disclaimer, the term of this patent is extended or adjusted under 35 U.S.C. 154(b) by 363 days.

(21) Appl. No.: 16/934,800

(22) Filed: Jul. 21, 2020

(65) Prior Publication Data

US 2021/0147732 A1   May 20, 2021

(30) Foreign Application Priority Data

May 22, 2019   (CN) .......................... 201910431906.1

(51) Int. Cl.
| | | |
|---|---|---|
| *C09J 163/00* | (2006.01) | |
| *C09J 9/02* | (2006.01) | |
| *C09J 4/06* | (2006.01) | |
| *C08K 3/08* | (2006.01) | |
| *C08K 7/18* | (2006.01) | |

(52) U.S. Cl.
CPC ............. *C09J 163/00* (2013.01); *C09J 4/06* (2013.01); *C09J 9/02* (2013.01); *C08K 3/08* (2013.01); *C08K 7/18* (2013.01); *C08K 2003/0806* (2013.01); *C08K 2201/005* (2013.01); *C08K 2201/011* (2013.01)

(58) Field of Classification Search
CPC ........ C08L 63/00–10; C09D 163/00–10; C09J 163/00–10; C09J 9/02; C09J 4/00; C09J 4/06; C08K 2003/0806
See application file for complete search history.

(56) References Cited

U.S. PATENT DOCUMENTS

| | | | |
|---|---|---|---|
| 2002/0011725 A1 | 8/2002 | Giroux et al. | |
| 2009/0155597 A1* | 6/2009 | Kropp | ........................ C09J 9/02 252/500 |

FOREIGN PATENT DOCUMENTS

| | | | |
|---|---|---|---|
| CN | 105238314 A | | 1/2016 |
| CN | 107474773 A | | 12/2017 |
| CN | 109233651 A | | 1/2019 |
| KR | 20090066233 A | * | 6/2009 |

OTHER PUBLICATIONS

Partial machine translation of CN 105238314 A (2016).*
Partial machine translation of KR 20090066233 A (2009).*
First Office Action The State Intellectual Property Office of People's Republic of China, Application No. or Publication No. 201910431906. 1, dated May 22, 2019.

* cited by examiner

*Primary Examiner* — Kregg T Brooks
(74) *Attorney, Agent, or Firm* — Flener IP & Business Law; Zareefa B. Flener

(57) ABSTRACT

The present invention refers to a composition, a low halogen and fast curing conductive adhesive and its preparation method. The composition includes the following raw materials measured by weight: epoxy resin 5-15 parts, curing agent 0.5-3 parts, acrylic acid component 5-12 parts, initiator 0.5-2 parts, flexibilizer 2-5 parts, wetting dispersant 0.1-1 parts, coupling agent 0.1-1 parts, antioxidant 0.1-1 parts, defoamer 0.1-1 parts and conductive silver filler 75-85 parts. The low halogen and fast curing conductive adhesive of the present invention has the advantages of fast curing (within 10 min), low halogen content, high bond strength, good moisture-heat aging resistance, good electric conductivity and thermal conductivity and so on, and has wide application prospects in the field of microelectronic packaging.

12 Claims, No Drawings

COMPOSITION, LOW HALOGEN AND FAST CURING CONDUCTIVE ADHESIVE AND ITS PREPARATION METHOD

CROSS-REFERENCE TO RELATED APPLICATIONS

The application claims priority of Chinese patent application CN201910431906.1, filed on May 22, 2019, the entire contents of which are incorporated herein by reference.

TECHNICAL FIELD

The invention refers to the field of microelectronic packaging technology, in particular to a composition for preparing a low halogen and fast curing conductive adhesive, and the low halogen and fast curing conductive adhesive and its preparation method.

BACKGROUND

In the field of microelectronic packaging, the technology of conductive adhesive bonding is a new lead-free technology to replace the traditional technology of metal welding. The use of conductive adhesive bonding has many advantages, including reducing process steps, lowering process temperature and saving manufacturing costs. The use of conductive adhesive technology can enable some temperature sensitive and low-cost circuit substrates to be applied and can meet the requirement of fine pitch interconnection. The conductive adhesive is generally composed of polymer resins, conductive fillers and functional auxiliaries. When the content of conductive fillers exceeds a certain threshold, conductive paths will be formed. Silver powder filled epoxy resin is widely used in the field of microelectronic packaging, which is mainly due to the characteristics of excellent bonding properties, heat resistance, mechanical properties and process properties of epoxy resin, and the characteristics of low resistivity, high thermal conductivity and not easily oxidized in air of conductive silver filler. However, there are still some problems in the commercial conductive adhesive product based on silver powder filled epoxy resin. Among the problems, the most important one is to reduce the viscosity of products, which is usually solved by adding glycidyl ether active epoxy diluent. However, such diluents generally have high halogen content. As a consequence, a small amount of addition could lead to excessive content of halogen. Furthermore, the curing rate is generally slow, so it usually takes about 1 hour to be cured, which affects the production efficiency.

SUMMARY

The purpose of the present invention is to overcome the defects of the prior arts and to provide a composition for preparing a low halogen and fast curing conductive adhesive.

Another purpose of the present invention is to provide a preparation method of a low halogen and fast curing conductive adhesive using the above mentioned composition.

Another purpose of the present invention is to provide a low halogen and fast curing conductive adhesive prepared by the above mentioned preparation method.

The technical proposals of the invention are as follows.

A composition for preparing a low halogen and fast curing conductive adhesive, which includes the following raw materials measured by weight: epoxy resin 5-15 parts, curing agent 0.5-3 parts, acrylic acid component 5-12 parts, initiator 0.5-2 parts, flexibilizer 2-5 parts, wetting dispersant 0.1-1 parts, coupling agent 0.1-1 parts, antioxidant 0.1-1 parts, defoamer 0.1-1 parts and conductive silver filler 75-85 parts;

the epoxy resin is at least one selected from electronic grade low halogen bisphenol-A epoxy resin, bisphenol-F epoxy resin, dicyclopentadienol epoxy resin and naphthol epoxy resin;

the acrylic acid component is acrylic monomers with a molecular weight of 100 to 400 and a hydrophobic structure;

the flexibilizer is electronic grade bisphenol-F epoxy resin modified by nano silica or core-shell structural rubber particles, preferably is NANOPDX E500 (EVONIK, Germany) and/or MX139 (KANEKA, Japan).

The electronic grade bisphenol-A epoxy resin is NPEL-127E (Nanya, Taiwan) or 328 (Huayi, Shanghai); the electronic grade bisphenol-F epoxy resin is 370 (Huayi, Shanghai) or JE-8672 (Jiadida, Shenzhen); the dicyclopentadienol epoxy resin is HP-7200 (DIC Corporation, Japan); the naphthol epoxy resin is HP-4032 (DIC Corporation, Japan).

In a preferred embodiment of the present invention, the acrylic monomers are at least one selected from phenoxybenzyl acrylate, 2-ethylhexyl acrylate, isobornyl acrylate, dicyclopentadienol acrylate, trimethylolpropanetriacrylate, methyl methacrylate, cyclohexyl methacrylate, isobornyl 2-methyl-2-propenoate, benzyl methacrylate, glycidyl methacrylate, trihydroxymethylcyclohexyl methacrylate and trimethylolpropanetrimethacrylate.

In a preferred embodiment of the present invention, the curing agent is at least one selected from 2-undecylimidazole, 1-cyanoethyl-2-methylimidazole, 1-benzyl-2-methylimidazole, 2-ethyl-4-methylimidazole and 1-cyanoethyl-2-undecylimidazole.

In a preferred embodiment of the present invention, the initiator is at least one selected from tert-butyl peroxybenzoate, tert-butyl peroxyacetate, benzoyl peroxide and tert-butyl peroxy-2-ethylhexanoate.

In a preferred embodiment of the present invention, the wetting dispersant is at least one selected from BYK-W969 (BYK, Germany), BYK-W980 (BYK, Germany), BYK996 (BYK, Germany), VATIX 2017 (Vatix, Beijing), VATIX 2018 (Vatix, Beijing).

In a preferred embodiment of the present invention, the coupling agent is at least one selected from SCA-E87M (NANJING CAPATUE CHEMICAL CO., LTD), SCA-E87E (NANJING CAPATUE CHEMICAL CO., LTD), Silok 6634E (Silok, Guangzhou), Silok 6634M (Silok, Guangzhou).

In a preferred embodiment of the present invention, the antioxidant is at least one selected from RIANOX 1010 (Rianlon, Tianjin), RIANOX 1076 (Rianlon, Tianjin), RIANOX 3114 (Rianlon, Tianjin), RIANOX 245 (Rianlon, Tianjin).

In a preferred embodiment of the present invention, the defoamer is at least one selected from BYK-A530 (BYK, Germany), BYK-320 (BYK, Germany), VATIX 1030 (Vatix, Beijing) and ACP-0001 (Dow Coring, America).

In a preferred embodiment of the present invention, the conductive silver filler consists of flaky silver powders with an average diameter of 1 μm to 20 μm, near spherical silver powders with an average particle size of 0.2 μm to 5 μm, and nanometer silver powders with an average particle size of 20 nm to 50 nm.

More preferably, the mass ratio of the flaky silver powders, the near spherical silver powders and the nanometer silver powders is 60-90:10-30:1-5.

More preferably, the average diameter of the flaky silver powders is 1 µm to 15 µm, further preferably is 1 µm to 10 µm.

More preferably, the average particle size of the near spherical silver powders is 1 µm to 3 µm.

The preparation method of the low halogen and fast curing conductive adhesive using the above mentioned composition includes the following steps:
(1) putting epoxy resin, curing agent, acrylic acid component, initiator, flexibilizer, wetting dispersant, coupling agent, antioxidant and defoamer into a blender to disperse to obtain a liquid mixture;
(2) adding conductive silver filler into the liquid mixture, dispersing in a blender, and then defoaming to obtain the low halogen and fast curing conductive adhesive.

Preferably, in step (1), the dispersing lasts for 1 min to 3 min.

Preferably, in step (1), the blender is in a mode of revolution and rotation synchronous agitation.

Preferably, in step (2), the dispersing lasts for 1 min to 3 min.

Preferably, in step (2), the defoaming lasts for 30 min to 60 min.

Preferably, in step (2), the defoaming is under the condition of −0.1 MPa.

Preferably, in step (2), the blender is in a mode of revolution and rotation synchronous agitation.

In a preferred embodiment of the present invention, the preparation method of the low halogen and fast curing conductive adhesive using the above mentioned composition includes the following steps:
(1) putting epoxy resin, curing agent, acrylic acid component, initiator, flexibilizer, wetting dispersant, coupling agent, antioxidant and defoamer into a blender using the revolution and rotation synchronous agitation mode to disperse for 1 min to 3 min to obtain a liquid mixture;
(2) adding conductive silver filler into the liquid mixture, disperse it for 1 min to 3 min in a blender using the revolution and rotation synchronous agitation mode, and then defoam for 30 min to 60 min under the condition of −0.11 MPa to obtain the low halogen and fast curing conductive adhesive.

A low halogen and fast curing conductive adhesive prepared by the above mentioned preparation method.

The beneficial effects of the present invention include:

1. The low halogen and fast curing conductive adhesive of the present invention has the advantages of fast curing (within 10 min), low halogen content, high bond strength, good moisture-heat aging resistance, good electric conductivity and thermal conductivity and so on, and has wide application prospects in the field of microelectronic packaging.

2. The epoxy resin contained in the present invention has low halogen content, and can be a composition of different epoxy resin types which can combine the advantages of different epoxy resin types effectively, so as to make the properties of adhesion, heat resistance, and aging resistance in moisture-heat environments to reach a better balance to obtain excellent overall performance.

3. The acrylic monomer in the present invention can significantly reduce the viscosity and improve the fluidity of the conductive adhesive; compared with glycidyl ether active epoxy diluent, the acrylic monomer has very low halogen content; and the acrylic monomer has a hydrophobic structure, and can improve the moisture-heat aging performance of the conductive adhesive.

4. The flexibilizer in the present invention is electronic grade bisphenol-F epoxy resin modified by nano silica or core-shell structural rubber particles; compared with adding traditional rubber flexibilizer, the flexibilizer has lower viscosity even under the condition of high rubber particle content, and more importantly, the glass transition temperature of the cured material has not been obvious effected.

5. The conductive silver filler in the present invention consists of flaky silver powders with an average diameter of 1 µm to 20 µm, near spherical silver powders with an average particle size of 0.2 µm to 5 µm, and nanometer silver powders with an average particle size of 20 nm to which can increase the contact area of conductive silver filler; and the added nano silver powder has low melting point, so that the conductive adhesive can be melted and sintered among the micron-level silver filler during heating process, and the contact resistance between conductive silver fillers can be reduced.

DETAILED DESCRIPTION OF THE EMBODIMENTS

The technical solutions of the present invention will be clearly and completely described in combination with the embodiments of the present invention.

The parts in the following examples is measured by weight.

Example 1

The following components were accurately weight and put into a blender using the revolution and rotation synchronous agitation mode to mix for 2 min: 2 parts of electronic grade bisphenol-A epoxy resin 328 (Huayi, Shanghai), 2 parts of naphthol epoxy resin HP-4032 (DIC Corporation, Japan), 3 parts of electronic grade bisphenol-F epoxy resin 370 (Huayi, Shanghai), 0.6 parts of curing agent 1-cyano-ethyl-2-methylimidazole, 4 parts of isobornyl acrylate, 3 parts of glycidyl methacrylate, 0.6 parts of tert-butyl peroxybenzoate, 2 parts of flexibilizer MX139 (KANEKA, Japan), 0.2 parts of wetting dispersant VATIX 2017 (Vatix, Beijing), 0.2 parts of coupling agent SCA-E87M (NANJING CAPATUE CHEMICAL CO., LTD), 0.2 parts of antioxidant RIANOX 1010 (Rianlon, Tianjin), 0.2 parts of defoamer VATIX 1030 (Vatix, Beijing). Then the following components were added to the above obtained liquid mixture and put into a blender using the revolution and rotation synchronous agitation mode to disperse for 2 min: 60 parts of flaky silver powders (with an average diameter of 5 µm), 20 parts of near spherical silver powders (with an average particle size of 0.6 µm) and 2 parts of nanometer silver powders (with an average particle size of 35 nm). The obtained mixture was defoamed for 30 min under the condition of −0.11 MPa to obtain the low halogen and fast curing conductive adhesive. The curing condition of this low halogen and fast curing conductive adhesive is 10 min at 170° C.

Example 2

The following components were accurately weight and put in to a blender using the revolution and rotation synchronous agitation mode to mix for 2 min: 2 parts of electronic grade bisphenol-A epoxy resin NPEL-127E (Nanya, Taiwan), 3 parts of naphthol epoxy resin HP-4032 (DIC Corporation, Japan), 3 parts of electronic grade bisphenol-F epoxy resin JE-8672 (Jiadida, Shenzhen), 0.8 parts of curing agent 1-benzyl-2-methylimidazole, 4 parts of trihydroxymethylcyclohexyl methacrylate, 4 parts of glycidyl methacrylate, 0.8 parts of tert-butyl peroxyacetate, 2 parts of flexibilizer MX139 (KANEKA, Japan), 0.1 parts of wetting dispersant BYK-W969 (BYK, Germany), 0.1 parts of coupling agent SCA-E87E (NANJING CAPATUE CHEMICAL CO., LTD), 0.1 parts of antioxidant RIANOX 3114 (Rianlon, Tianjin), 0.1 parts of defoamer BYK-A530 (BYK, Germany). Then the following components were added to the above obtained liquid mixture and put in to a blender using the revolution and rotation synchronous agitation mode to disperse for 3 min: 65 parts of flaky silver powders (with an average diameter of 12 μm), 12 parts of near spherical silver powders (with an average particle size of 1.5 μm) and 3 parts of nanometer silver powders (with an average particle size of 30 nm). The obtained mixture was defoamed for 40 min under the condition of −0.1 MPa to obtain the low halogen and fast curing conductive adhesive. The curing condition of this low halogen and fast curing conductive adhesive is 5 min at 175° C.

Example 3

The following components were accurately weight and put in to a blender using the revolution and rotation synchronous agitation mode to mix for 2 min: 2 parts of electronic grade bisphenol-A epoxy resin 328 (Huayi, Shanghai), 2 parts of dicyclopentadienol epoxy resin HP-7200 (DIC Corporation, Japan), electronic grade bisphenol-F epoxy resin JE-8672 (Jiadida, Shenzhen), 0.8 parts of curing agent 1-cyanoethyl-2-methylimidazole, 2 parts of dicyclopentadienol acrylate, 2 parts of isobornyl 2-methyl-2-propenoate, 3 parts of glycidyl methacrylate, 0.8 parts of tert-butyl peroxybenzoate, 3 parts of flexibilizer NANOPDX E500 (EVONIK, Germany), 0.1 parts of wetting dispersant VATIX 2018 (Vatix, Beijing), 0.1 parts of coupling agent Silok 6634E (Silok, Guangzhou), 0.1 parts of antioxidant RIANOX 245 (Rianlon, Tianjin), 0.1 parts of defoamer BYK-320 (BYK, Germany). Then the following components were added to the above obtained liquid mixture and put in to a blender using the revolution and rotation synchronous agitation mode to disperse for 2 min: 70 parts of flaky silver powders (with an average diameter of 8 μm), 10 parts of near spherical silver powders (with an average particle size of 1.4 μm) and 1 part of nanometer silver powders (with an average particle size of 40 nm). The obtained mixture was defoamed for 50 min under the condition of −0.1 MPa to obtain the low halogen and fast curing conductive adhesive. The curing condition of this low halogen and fast curing conductive adhesive is 8 min at 170° C.

Example 4

The following components were accurately weight and put in to a blender using the revolution and rotation synchronous agitation mode to mix for 1 min: 3 parts of dicyclopentadienol epoxy resin HP-7200 (DIC Corporation, Japan), 5 parts of electronic grade bisphenol-F epoxy resin JE-8672 (Jiadida, Shenzhen), 1 part of curing agent 2-ethyl-4-methylimidazole, 6 parts of dicyclopentadienol acrylate, 5 parts of glycidyl methacrylate, 0.6 part of benzoyl peroxide, 1 part of flexibilizer NANOPDX E500 (EVONIK, Germany), 0.1 parts of wetting dispersant BYK-W969 (BYK, Germany), 0.1 parts of coupling agent Silok 6634E (Silok, Guangzhou), 0.1 parts of antioxidant RIANOX 1076 (Rianlon, Tianjin), 0.1 parts of defoamer BYK-320 (BYK, Germany). Then the following components were added to the above obtained liquid mixture and put in to a blender using the revolution and rotation synchronous agitation mode to disperse for 2 min: 64 parts of flaky silver powders (with an average diameter of 3 μm), 12 parts of near spherical silver powders (with an average particle size of 0.4 μm) and 2 parts of nanometer silver powders (with an average particle size of 25 nm). The obtained mixture was defoamed for 40 min under the condition of −0.11 MPa to obtain the low halogen and fast curing conductive adhesive. The curing condition of this low halogen and fast curing conductive adhesive is 8 min at 175° C.

Example 5

The following components were accurately weight and put in to a blender using the revolution and rotation synchronous agitation mode to mix for 1 min: 6 parts of naphthol epoxy resin HP-4032 (DIC Corporation, Japan), 8 parts of electronic grade bisphenol-F epoxy resin 370 (Huayi, Shanghai), 1 part of curing agent 2-undecylimidazole, 3 parts of benzyl methacrylate, 2 parts of glycidyl methacrylate, 0.6 parts of tert-butyl peroxyacetate, 2 parts of flexibilizer MX139 (KANEKA, Japan), 0.1 parts of wetting dispersant VATIX 2017 (Vatix, Beijing), 0.1 parts of coupling agent SCA-E87M (NANJING CAPATUE CHEMICAL CO., LTD), 0.1 parts of antioxidant RIANOX 3114 (Rianlon, Tianjin), 0.1 parts of defoamer BYK-A530 (BYK, Germany). Then the following components were added to the above obtained liquid mixture and put in to a blender using the revolution and rotation synchronous agitation mode to disperse for 2 min: 60 parts of flaky silver powders (with an average diameter of 18 μm), 15 parts of near spherical silver powders (with an average particle size of 1.8 μm) and 2 parts of nanometer silver powders (with an average particle size of 45 nm). The obtained mixture was defoamed for 60 min under the condition of −0.11 MPa to obtain the low halogen and fast curing conductive adhesive. The curing condition of this low halogen and fast curing conductive adhesive is 5 min at 175° C.

Example 6

The following components were accurately weight and put in to a blender using the revolution and rotation synchronous agitation mode to mix for 2 min: 10 electronic grade bisphenol-F epoxy resin JE-8672 (Jiadida, Shenzhen), 1 part of curing agent 1-cyanoethyl-2-methylimidazole, 4 parts of isobornyl acrylate, 4 parts of glycidyl methacrylate, 0.6 parts of tert-butyl peroxybenzoate, 3 parts of flexibilizer MX139 (KANEKA, Japan), 0.1 parts of wetting dispersant VATIX 2018 (Vatix, Beijing), 0.1 parts of coupling agent SCA-E87E (NANJING CAPATUE CHEMICAL CO., LTD), 0.1 parts of antioxidant RIANOX 245 (Rianlon, Tianjin), 0.1 parts of defoamer BYK-A530 (BYK, Germany). Then the following components were added to the above obtained liquid mixture and put in to a blender using the revolution and rotation synchronous agitation mode to disperse for 2 min: 65 parts of flaky silver powders (with an average diameter of 15 μm), 10 parts of near spherical silver powders (with an average particle size of 1.5 μm) and 2 parts of nanometer silver powders (with an average particle size of 35 nm). The obtained mixture was defoamed for 60 min under the condition of −0.1 MPa to obtain the low halogen and fast curing conductive adhesive. The curing condition of this low halogen and fast curing conductive adhesive is 6 min at 175° C.

Test 1 Halogen Content Test

The chlorine content and bromine content of the samples obtained by the above examples were measured using X fluorescence spectrometer based on EN 14582:2007 test standard.

Test 2 Viscosity Test

The viscosity of the samples obtained by the above examples were measured using rotary viscometer at room temperature.

Test 3 Volume Resistivity Test

The volume resistivity of the samples obtained by the above examples were measured based on the four probe method and ASTM D257-2007 test standard.

Test 4 Thermal Conductivity

The thermal conductivity of the samples obtained by the above examples were measured using a laser thermal conductivity instrument and based on ASTM E1461-07 test standard.

Test 5 Shear Strength Test

The shear strength of the samples obtained by the above examples were measured using a universal mechanical testing machine and based on ASTM D1002 test standard.

Test 6 Moisture-Heat Aging Resistance (M-H Aging Resistance)

The moisture-heat aging resistance of the samples obtained by the above examples were measured under the condition of 85° C. and 85% humidity under GB2423.03 test standard. The results of the above tests are shown in Table 1 below.

TABLE 1 test results of examples 1-6

| | Viscosity after mixing (mPa · S) | Curing time (min) | Halogen (chlorine) content (ppm) | Volume resistivity ($10^{-4}\Omega \cdot cm$) | Thermal conductivity (W/m · K) | Shear strength (MPa) | Decline of M-H aging resistance (%) |
|---|---|---|---|---|---|---|---|
| Example 1 | 8180 | 10 | 90 | 2.6 | 3.4 | 16 | 7% |
| Example 2 | 8250 | 5 | 76 | 4.2 | 2.8 | 17 | 8% |
| Example 3 | 8050 | 8 | 65 | 1.3 | 3.9 | 20 | 4% |
| Example 4 | 7980 | 8 | 85 | 7.8 | 2.3 | 21 | 6% |
| Example 5 | 8140 | 5 | 68 | 9.5 | 2.1 | 19 | 7% |
| Example 6 | 7560 | 6 | 82 | 8.5 | 2.0 | 19 | 13% |

The above description is only the preferred embodiments of the present invention and is not intended to limit the present invention. Any modification, equivalent replacement and the like within the spirit and principle of the present invention shall be included in the protection scope of the present invention.

What is claimed is:

1. A composition for preparing a low halogen and fast curing conductive adhesive, characterized in that, it is composed of the following raw materials measured by weight: epoxy resin 5-15 parts, curing agent 0.5-3 parts, acrylic acid component 5-12 parts, initiator 0.5-2 parts, flexibilizer 2-5 parts, wetting dispersant 0.1-1 parts, coupling agent 0.1-1 parts, antioxidant 0.1-1 parts, defoamer 0.1-1 parts and conductive silver filler 75-85 parts;

the epoxy resin is at least one selected from electronic grade low halogen bisphenol-A epoxy resin, bisphenol-F epoxy resin, dicyclopentadienol epoxy resin and naphthol epoxy resin;

the acrylic acid component is acrylic monomers with a molecular weight of 100 to 400 and a hydrophobic structure; the acrylic monomers are at least one selected from phenoxybenzyl acrylate, 2-ethylhexyl acrylate, isobornyl acrylate, dicyclopentadienol acrylate, trimethylolpropanetriacrylate, methyl methacrylate, cyclohexyl methacrylate, isobornyl 2-methyl-2-propenoate, benzyl methacrylate, glycidyl methacrylate, and trihydroxymethylcyclohexyl methacrylate;

the flexibilizer is electronic grade bisphenol-F epoxy resin modified by nano silica or core-shell structural rubber particles;

the conductive silver filler consists of flaky silver powders, near spherical silver powders, and nanometer silver powders.

2. The composition of claim 1, characterized in that, the curing agent is at least one selected from 2-undecylimidazole, 1-cyanoethyl-2-methylimidazole, 1-benzyl-2-methylimidazole, 2-ethyl-4-methylimidazole and 1-cyanoethyl-2-undecylimidazole.

3. The composition of claim 1, characterized in that, the initiator is at least one selected from tert-butyl peroxybenzoate, tert-butyl peroxyacetate, benzoyl peroxide and tert-butyl peroxy-2-ethylhexanoate.

4. The composition of claim 1, characterized in that, the mass ratio of the flaky silver powders, the near spherical silver powders and the nanometer silver powders is 60-90:10-30:1-5.

5. A preparation method of a low halogen and fast curing conductive adhesive using the composition of claim 1, characterized in that, it includes the following steps: (1) putting the epoxy resin, the curing agent, the acrylic acid component, the initiator, the flexibilizer, the wetting the dispersant, the coupling agent, the antioxidant and the defoamer into a blender to disperse to obtain a liquid mixture; (2) adding the conductive silver filler into the liquid mixture, dispersing in a blender, and then defoaming to obtain the low halogen and fast curing conductive adhesive.

6. The preparation method of claim 5, characterized in that, in step (1), the dispersing lasts for 1 min to 3 min.

7. The preparation method of claim 5, characterized in that, in step (1), the blender is in a mode of revolution and rotation synchronous agitation.

8. The preparation method of claim 5, characterized in that, in step (2), the dispersing lasts for 1 min to 3 min.

9. The preparation method of claim 5, characterized in that, in step (2), the defoaming lasts for 30 min to 60 min.

10. The preparation method of claim 5, characterized in that, in step (2), the defoaming is under the condition of −0.1 MPa.

11. The preparation method of claim 5, characterized in that, in step (2), the blender is in a mode of revolution and rotation synchronous agitation.

12. The low halogen and fast curing conductive adhesive prepared by the preparation method of claim 5.

\* \* \* \* \*